United States Patent
Li et al.

(10) Patent No.: US 12,504,364 B2
(45) Date of Patent: Dec. 23, 2025

(54) IN-SITU MONITORING TO LABEL TRAINING SPECTRA FOR MACHINE LEARNING SYSTEM FOR SPECTROGRAPHIC MONITORING

(71) Applicant: Applied Materials, Inc., Santa Clara, CA (US)

(72) Inventors: Thomas Li, Santa Clara, CA (US); Benjamin Cherian, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 901 days.

(21) Appl. No.: 17/673,697

(22) Filed: Feb. 16, 2022

(65) Prior Publication Data

US 2022/0283082 A1    Sep. 8, 2022

Related U.S. Application Data

(60) Provisional application No. 63/155,926, filed on Mar. 3, 2021.

(51) Int. Cl.
   *G01N 21/31* (2006.01)
   *G01J 5/08* (2022.01)
   (Continued)

(52) U.S. Cl.
   CPC ............ *G01N 21/31* (2013.01); *G01J 5/0859* (2013.01); *G01K 7/02* (2013.01); *G01N 1/32* (2013.01);
   (Continued)

(58) Field of Classification Search
   USPC .......................................................... 702/23
   See application file for complete search history.

(56) References Cited

U.S. PATENT DOCUMENTS

| | | |
|---|---|---|
| 5,722,875 A | 3/1998 | Iwashita et al. |
| 5,851,135 A | 12/1998 | Sandhu et al. |

(Continued)

FOREIGN PATENT DOCUMENTS

| | | |
|---|---|---|
| CN | 109313724 A | 2/2019 |
| CN | 109500726 | 3/2019 |

(Continued)

OTHER PUBLICATIONS

Office Action in Taiwanese Appln. No. 111107451, dated Jun. 15, 2023, 14 pages (with English Summary and Search Report).

(Continued)

*Primary Examiner* — Paul D Lee
(74) *Attorney, Agent, or Firm* — Fish & Richardson P.C.

(57) ABSTRACT

A method of training a neural network for spectrographic monitoring includes polishing a test substrate, measuring by an in-situ spectrographic monitoring system a sequence of test spectra of light reflected from the substrate and measuring by an in-situ non-optical monitoring system a sequence of test values from the substrate during polishing of the test substrate, measuring at least one of an initial characterizing value for the substrate before polishing or a final characterizing value for the substrate after polishing, inputting the sequence of test values and the initial characterizing value and/or final characterizing value into a thickness predictive model that outputs a sequence of training values with each respective training value in the sequence of training values associated with a respective test spectrum from the sequence of test spectra, and training an artificial neural network using the plurality of training spectra and the plurality of training values.

19 Claims, 6 Drawing Sheets

(51) Int. Cl.
  *G01K 7/02* (2021.01)
  *G01N 1/32* (2006.01)
  *G01R 19/00* (2006.01)
  *G06N 3/08* (2023.01)
  *G01J 5/00* (2022.01)
  *G01R 31/28* (2006.01)
  *G06N 3/04* (2023.01)

(52) U.S. Cl.
  CPC .......... *G01R 19/0092* (2013.01); *G06N 3/08* (2013.01); *G01J 2005/0077* (2013.01); *G01R 31/2831* (2013.01); *G06N 3/04* (2013.01)

(56) References Cited

U.S. PATENT DOCUMENTS

| | | | |
|---|---|---|---|
| 5,873,769 | A | 2/1999 | Chiou et al. |
| 5,957,750 | A | 9/1999 | Brunelli |
| 6,102,776 | A | 8/2000 | Boggs et al. |
| 6,120,347 | A | 9/2000 | Sandhu et al. |
| 6,494,765 | B2 | 12/2002 | Gitis et al. |
| 10,732,607 | B2 | 8/2020 | Cherian |
| 10,795,346 | B2 | 10/2020 | Yennie et al. |
| 10,994,389 | B2 | 5/2021 | Xu et al. |
| 2005/0118839 | A1 | 6/2005 | Chen |
| 2007/0042675 | A1 | 2/2007 | Benvegnu et al. |
| 2007/0238395 | A1 | 10/2007 | Kimura et al. |
| 2008/0268751 | A1 | 10/2008 | Yokoyama et al. |
| 2010/0151771 | A1 | 6/2010 | Nabeya |
| 2011/0256805 | A1* | 10/2011 | David ............... B24B 49/12 451/5 |
| 2012/0003759 | A1 | 1/2012 | Hu et al. |
| 2012/0034844 | A1 | 2/2012 | Zhang et al. |
| 2012/0034846 | A1 | 2/2012 | Minamihaba et al. |
| 2012/0190273 | A1 | 7/2012 | Ono et al. |
| 2013/0023186 | A1 | 1/2013 | Motoshima et al. |
| 2013/0237128 | A1 | 9/2013 | David et al. |
| 2013/0288570 | A1 | 10/2013 | David |
| 2014/0020829 | A1 | 1/2014 | Chen et al. |
| 2014/0242881 | A1* | 8/2014 | David ............... B24B 49/12 451/5 |
| 2016/0184960 | A1 | 6/2016 | Matsuo et al. |
| 2017/0232572 | A1 | 8/2017 | Brown |
| 2017/0239778 | A1 | 8/2017 | Maruyama et al. |
| 2017/0351952 | A1 | 12/2017 | Zhang et al. |
| 2018/0150052 | A1 | 5/2018 | Cherian |
| 2018/0236631 | A1 | 8/2018 | Eto et al. |
| 2019/0072482 | A1 | 3/2019 | Feng et al. |
| 2019/0143476 | A1 | 5/2019 | Wu et al. |
| 2019/0148246 | A1 | 5/2019 | Zhan et al. |
| 2019/0283209 | A1 | 9/2019 | Osterheld et al. |
| 2019/0286075 | A1 | 9/2019 | Yennie et al. |
| 2019/0286111 | A1 | 9/2019 | Yennie et al. |
| 2020/0005139 | A1* | 1/2020 | Cherian ............. G05B 19/4155 |
| 2020/0005140 | A1 | 1/2020 | Cherian et al. |
| 2020/0101579 | A1 | 4/2020 | Suzuki |
| 2020/0331113 | A1 | 10/2020 | Soundararajan et al. |
| 2020/0356011 | A1 | 11/2020 | Su et al. |
| 2021/0170544 | A1* | 6/2021 | Yagi ..................... B24B 37/013 |
| 2022/0168864 | A1 | 6/2022 | Kato et al. |

FOREIGN PATENT DOCUMENTS

| | | |
|---|---|---|
| CN | 110948379 | 4/2020 |
| CN | 111051993 A | 4/2020 |
| CN | 111566674 A | 8/2020 |
| CN | 111587478 | 8/2020 |
| CN | 111902924 | 11/2020 |
| CN | 111931738 A | 11/2020 |
| JP | H11-10535 | 1/1999 |
| JP | 2008-277450 | 11/2008 |
| JP | 2015-520508 | 7/2015 |
| JP | 2019-537270 | 12/2019 |
| JP | 2020-518131 | 6/2020 |
| JP | 2020-107784 | 7/2020 |
| JP | 2020-170391 | 10/2020 |
| JP | 2021-028099 | 2/2021 |
| KR | 10-2013-0010844 | 1/2013 |
| KR | 101322410 | 10/2013 |
| TW | 201206630 | 2/2012 |
| TW | 201344165 A | 11/2013 |
| TW | 201834790 | 10/2018 |

OTHER PUBLICATIONS

Office Action in Japanese Appln. No. 2022-578831, dated Apr. 16, 2024, 6 pages (with English translation).

International Search Report and Written Opinion in International Appln. No. PCT/US2022/016657, dated May 23, 2022, 10 pages.

Extended European Search Report in European Appln. No. 22763754.3, mailed Jan. 8, 2025, 5 pages.

Office Action in Indian Appln. No. 202247076757, mailed Mar. 20, 2025, 8 pages (with English translation).

Chen, "Research on Spectral Detection and Identification Technology in Laser Damage," China Master's Thesis, Jul. 15, 2020, 74 pages (with English abstract only).

Office Action in Chinese Appln. No. 202210210644.8, mailed on Apr. 1, 2025, 11 pages (with English translation).

* cited by examiner

IN-SITU MONITORING TO LABEL TRAINING SPECTRA FOR MACHINE LEARNING SYSTEM FOR SPECTROGRAPHIC MONITORING

CROSS-REFERENCE TO RELATED APPLICATIONS

This application claims priority to U.S. Application Ser. No. 63/155,926, filed on Mar. 3, 2021, the disclosure of which is incorporated by reference.

TECHNICAL FIELD

The present disclosure relates to optical monitoring of a substrate, e.g., during processing such as chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For some applications, the filler layer is planarized until the top surface of a patterned layer is exposed. For example, a conductive filler layer can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, the filler layer is planarized until a predetermined thickness is left over an underlying layer. For example, a dielectric layer deposited can be planarized for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad.

One problem in CMP is using an appropriate polishing rate to achieve a desirable profile, e.g., a substrate layer that has been planarized to a desired flatness or thickness, or a desired amount of material has been removed. Variations in the initial thickness of a substrate layer, the slurry distribution, the polishing pad condition, the relative speed between the polishing pad and a substrate, and the load on a substrate can cause variations in the material removal rate across a substrate, and from substrate to substrate. These variations cause variations in the time needed to reach the polishing endpoint and the amount removed. Therefore, it may not be possible to determine the polishing endpoint merely as a function of the polishing time, or to achieve a desired profile merely by applying a constant pressure.

In some systems, a substrate is monitored in-situ during polishing, e.g., by an optical monitoring system. Thickness measurements from the in-situ monitoring system can be used to adjust pressure applied to the substrate to adjust the polishing rate and reduce within-wafer non-uniformity (WIWNU).

SUMMARY

In one aspect, a method of training a neural network for spectrographic monitoring includes polishing a test substrate, measuring by an in-situ spectrographic monitoring system a sequence of test spectra of light reflected from the substrate during polishing of the test substrate, measuring by an in-situ non-optical monitoring system a sequence of test values from the substrate during polishing of the test substrate, measuring at least one of an initial characterizing value for the substrate before polishing or a final characterizing value for the substrate after polishing, inputting the sequence of test values and the initial characterizing value and/or final characterizing value into a thickness predictive model that outputs a sequence of training values with each respective training value in the sequence of training values associated with a respective test spectrum from the sequence of test spectra, and training an artificial neural network using the plurality of training spectra and the plurality of training values. The artificial neural network has a plurality of input nodes for a plurality of spectral values, an output node to output a characterizing value, and a plurality of hidden nodes connecting the input nodes to the output node.

These aspects may be embodied in computer program product tangibly embodied in a non-transitory computer readable media and comprising instructions for causing a processor to carry out operations, or in a processing system, e.g., a polishing system, having a controller to carry out the operations.

Implementations of any of the aspects may include one or more of the following features.

Certain implementations may have, but are not limited to, one or more of the following advantages. The spectra used for training of a machine learning system, e.g., a neural network, can be labelled more accurately, thus improving the predictive performance of the machine learning system. The thickness of a layer on a substrate can be measured more accurately and/or more quickly. Within-wafer thickness non-uniformity and wafer-to-wafer thickness non-uniformity (WIWNU and WTWNU) may be reduced, and reliability of an endpoint system to detect a desired processing endpoint may be improved.

The details of one or more embodiments are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

One monitoring technique is to measure a spectrum of light reflected from a substrate being polished. A variety of techniques have been proposed to determine a characteristic value, e.g., a thickness of the layer being polished, from the measured spectrum. A possible technique is to train a neural network based on training spectra from sample substrates and measured characteristic values for those sample substrates. After training, during normal operation, a measured spectrum from a device substrate can be input to the neural network, and the neural network can output a characterizing value, e.g., a calculated thickness of a top layer of the substrate. A motivation to use neural networks is the potential to remove the impact of under-layer film thickness on the calculated thickness of the top layer.

In order to obtain the training data, a sequence of spectra can be measured during polishing of a test substrate. A characterizing value, e.g., the thickness, of the substrate can be measured before and after polishing, e.g., with a stand-alone or in-line metrology system. These two values would then be associated with the first and last spectra in sequence. Characterizing values for the remaining spectra in the sequence can be generated by linear interpolation, e.g., based on time. The training data would thus include the set of spectra, with each spectra having an associated characterizing value.

A problem with this technique is that the characterizing values, e.g., the thickness values, are known with certainty only for the initial and final spectra in the sequence. For many processes, the characterizing value can change non-linearly over time. In order to address this, signals from another in-situ monitoring system, e.g., non-optical monitoring system such as a motor current monitoring system, can be fed to a thickness predictive model. The thickness predictive model can output a thickness value for the time stamp of each spectrum in the sequence that is more accurate than simply using linear interpolation based on time.

Figure 1:
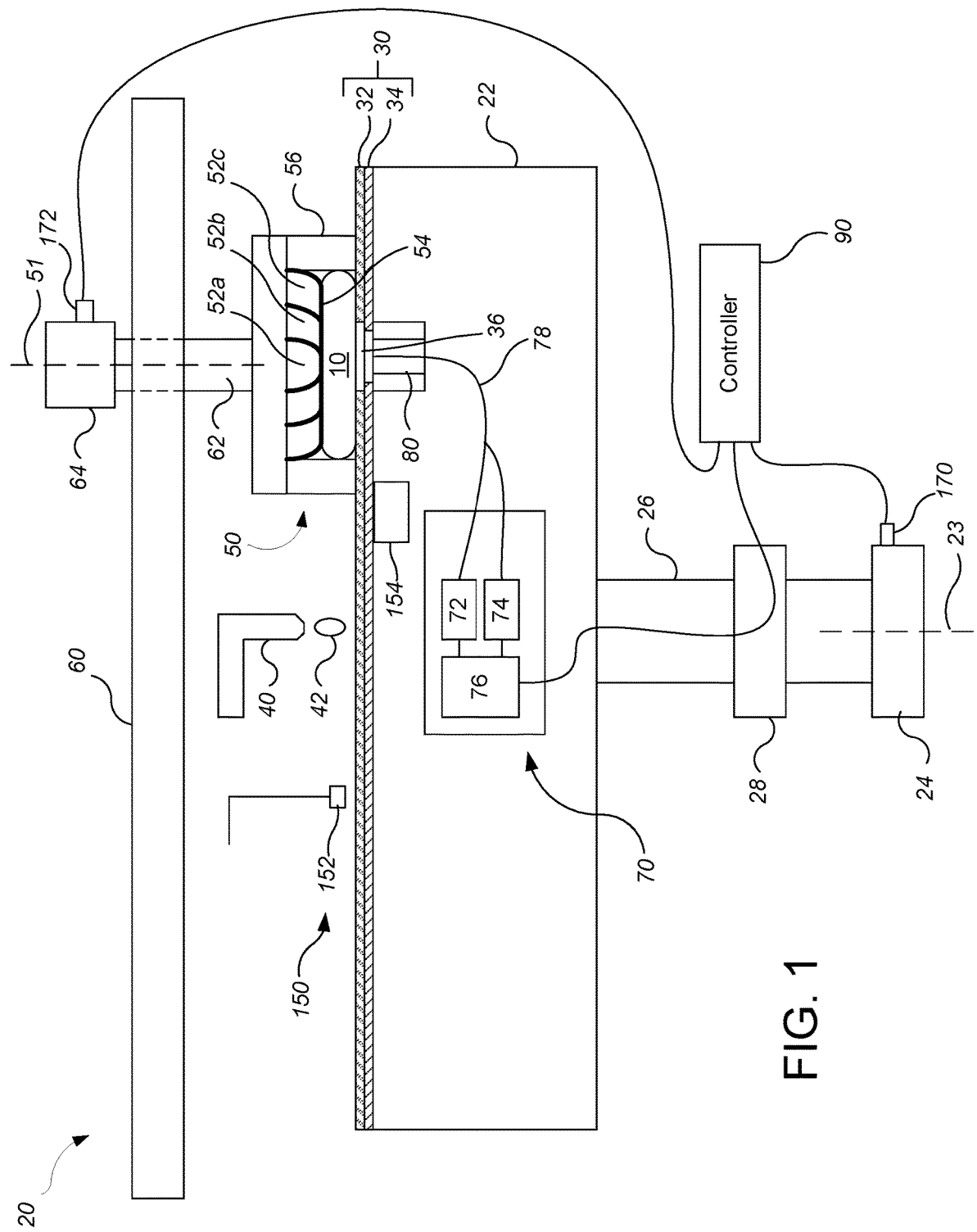
FIG. 1 illustrates a schematic cross-sectional view of an example of a polishing apparatus.

FIG. 1 illustrates an example of a polishing apparatus 20. The polishing apparatus 20 can include a rotatable disk-shaped platen 22 on which a polishing pad 30 is situated. The platen is operable to rotate about an axis 23. For example, a motor 24 can turn a drive shaft 26 to rotate the platen 22. The polishing pad 30 can be detachably secured to the platen 22, for example, by a layer of adhesive. The polishing pad 30 can be a two-layer polishing pad with an outer polishing layer 32 and a softer backing layer 34.

The polishing apparatus 20 can include a polishing liquid supply port 40 to dispense a polishing liquid 42, such as an abrasive slurry, onto the polishing pad 30. The polishing apparatus 20 can also include a polishing pad conditioner to abrade the polishing pad 30 to maintain the polishing pad 30 in a consistent abrasive state.

Figure 2:
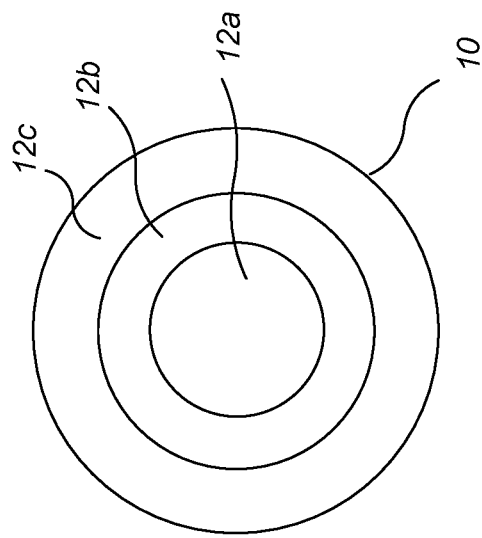
FIG. 2 illustrates a schematic top view of a substrate having multiple zones.

A carrier head 50 is operable to hold a substrate 10 against the polishing pad 30. Each carrier head 50 also includes a plurality of independently controllable pressurizable chambers, e.g., three chambers 52a-52c, which can apply independently controllable pressurizes to associated zones 12a-12c on the substrate 10 (see FIG. 2). Referring to FIG. 2, the center zone 12a can be substantially circular, and the remaining zones 12b-12c can be concentric annular zones around the center zone 12a.

Returning to FIG. 1, the chambers 52a-52c can be defined by a flexible membrane 54 having a bottom surface to which the substrate 10 is mounted. The carrier head 50 can also include a retaining ring 56 to retain the substrate 10 below the flexible membrane 54. Although only three chambers are illustrated in FIGS. 1 and 2 for ease of illustration, there could be two chambers, or four or more chambers, e.g., five chambers. In addition, other mechanisms to adjust the pressure applied to the substrate, e.g., piezoelectric actuators, could be used in the carrier head 50.

Each carrier head 50 is suspended from a support structure 60, e.g., a carousel or track, and is connected by a drive shaft 62 to a carrier head rotation motor 64 so that the carrier head can rotate about an axis 51. Optionally each carrier head 50 can oscillate laterally, e.g., on sliders on the carousel, by motion along or track; or by rotational oscillation of the carousel itself. In operation, the platen 22 is rotated about its central axis 23, and the carrier head 50 is rotated about its central axis 51 and translated laterally across the top surface of the polishing pad 30.

The polishing apparatus also includes an in-situ spectrographic monitoring system 70, which can be used to control the polishing parameters, e.g., the applied pressure in one or more of the chambers 52a-52c, to control the polishing rate of one or more of the zones 12a-12c. The in-situ monitoring spectrographic system 70 generates measurement of the spectrum of light reflected from the substrate, which can be converted into a characteristic value indicative of the thickness of the layer being polished in each of the zones 12a-12c.

The spectrographic monitoring system 70 can include a light source 72, a light detector 74, and circuitry 76 for sending and receiving signals between a controller 90, e.g., a computer, and the light source 72 and light detector 74. One or more optical fibers can be used to transmit the light from the light source 72 to a window 36 in the polishing pad 30, and to transmit light reflected from the substrate 10 to the detector 74. For example, a bifurcated optical fiber 78 can be used to transmit the light from the light source 72 to the substrate 10 and back to the detector 74. As a spectrographic system, then the light source 72 can be operable to emit white light and the detector 74 can be a spectrometer.

The output of the circuitry 76 can be a digital electronic signal that passes through a rotary coupler 28, e.g., a slip ring, in the drive shaft 26 to the controller 90. Alternatively, the circuitry 76 could communicate with the controller 90 by a wireless signal. The controller 90 can be a computing device that includes a microprocessor, memory and input/output circuitry, e.g., a programmable computer. Although illustrated with a single block, the controller 90 can be a networked system with functions distributed across multiple computers.

Figure 3:
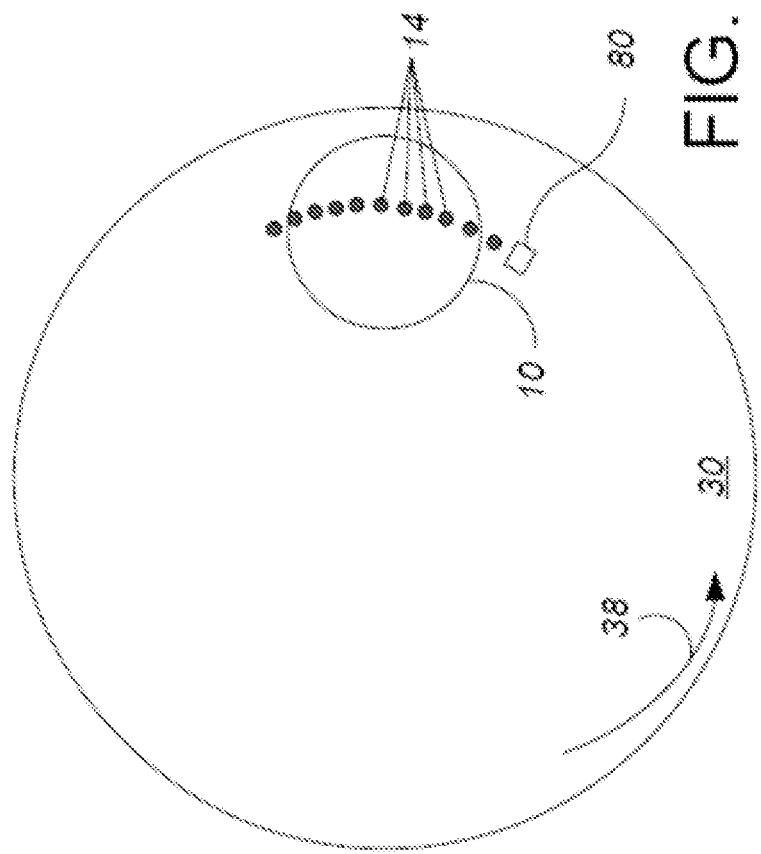
FIG. 3 illustrates is a schematic top view showing locations where in-situ measurements are taken on a first substrate.

In some implementations, the in-situ spectrographic monitoring system 70 includes a sensor 80 that is installed in and rotate with the platen 22. For example, the sensor 80 could be the end of the optical fiber 78. The motion of the platen 22 will cause the sensor 80 to scan across the substrate. As shown by in FIG. 3, due to the rotation of the platen (shown by arrow 38), as the sensor 80 travels below the carrier head, the in-situ spectrographic monitoring system makes measurements at a sampling frequency; as a result, the measurements are taken at locations 14 in an arc that traverses the substrate 10 (the number of points is illustrative; more or fewer measurements can be taken than illustrated, depending on the sampling frequency).

Over one rotation of the platen, spectra are obtained from different positions on the substrate 10. In particular, some spectra can be obtained from locations closer to the center of the substrate 10 and some can be obtained from locations closer to the edge. The controller 90 can be configured to calculate a radial position (relative to the center of the substrate 10) for each measurement from a scan based on timing, motor encoder information, platen rotation or position sensor data, and/or optical detection of the edge of the substrate and/or retaining ring. The controller can thus associate the various measurements with the various zones 12a-12c (see FIG. 2). In some implementations, the time of measurement of can be used as a substitute for the exact calculation of the radial position.

Returning to FIG. 1, the controller 90 can derive a characterizing value for each zone of the substrate based on the signal from the in-situ monitoring system. In particular, as polishing progresses, the controller 90 generates a sequence over time of characterizing values. The controller 90 can generate at least one characterizing value for each zone for each scan of the sensor below the substrate 10, or generate a characterizing value for each zone at a measurement frequency (which need not be the same as the sampling frequency), e.g., for polishing systems that do not scan the sensor across the substrate. In some implementations, a single characterizing value is generated per scan, e.g., multiple measurements can be combined to generate the characterizing value. In some implementations, each measurement is used to generate a characterizing value.

The characterizing value is typically the thickness of the outer layer, but can be a related characteristic such as thickness removed. In addition, the characterizing value can be a more generic representation of the progress of the substrate through the polishing process, e.g., an index value representing the time or number of platen rotations at which the measurement would be expected to be observed in a polishing process that follows a predetermined progress.

The controller 90 can use a two-step process to generate a characterizing value from a measured spectrum from the in-situ spectrographic monitoring system 70. First, the dimensionality of the measured spectrum is reduced, and then the reduced dimensionality data is input to an artificial neural network, which will output the characterizing value. By performing this process for each measured spectrum, the artificial neural network can generate a sequence of characterizing values. This sequence can include characterizing values for different radial locations on the substrate, e.g., assuming that the sensor 80 is passing below the substrate.

The combination of the in-situ spectrographic monitoring system 70 and the controller 90 can provide an endpoint and/or polishing uniformity control system 100. That is, the controller 90 can detect a polishing endpoint and halt polishing and/or adjust polishing pressures during the polishing process to reduce polishing non-uniformity, based on the series of characterizing values.

Figure 4:
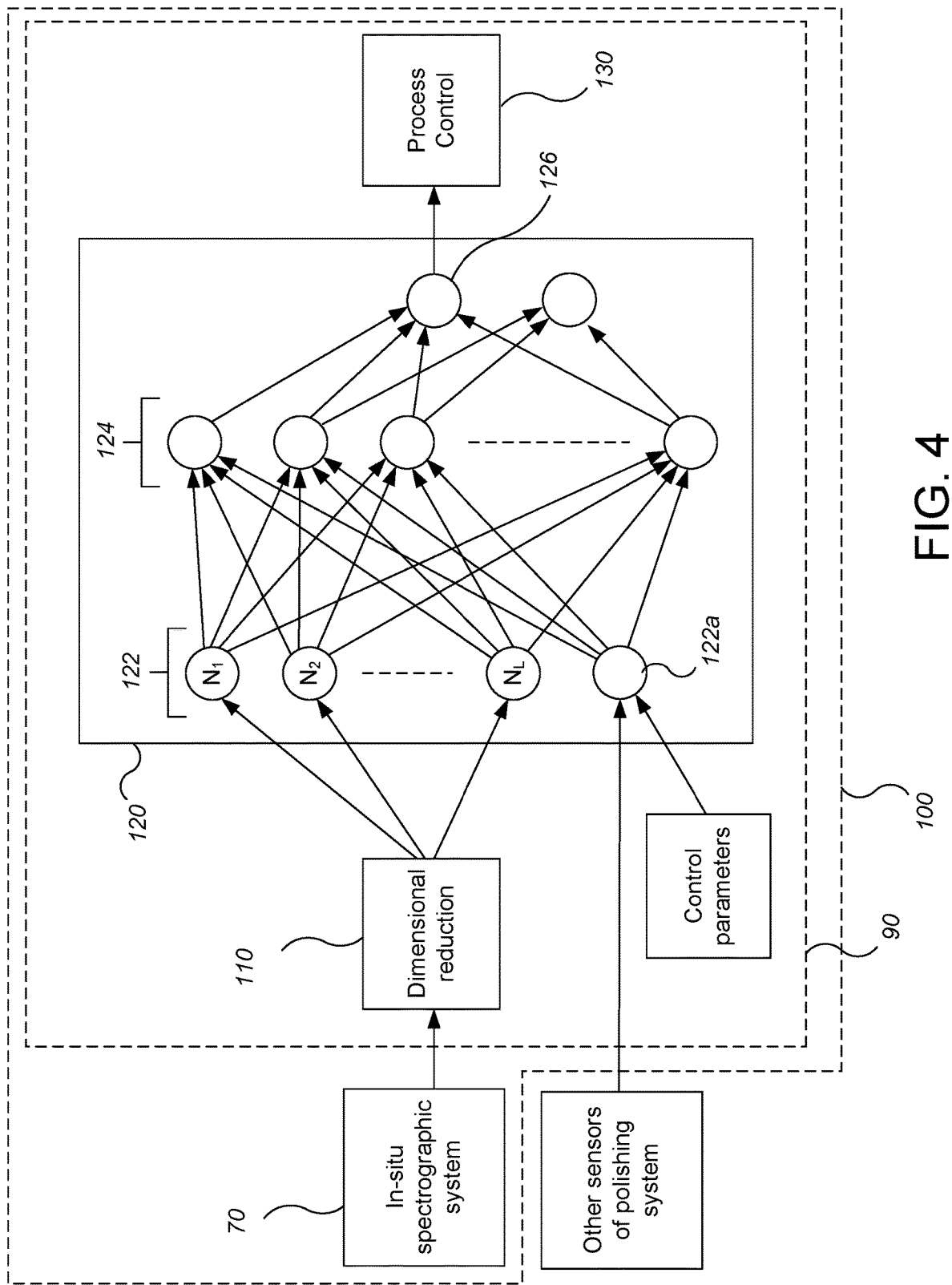
FIG. 4 illustrates a neural network used as part of the controller for the polishing apparatus.

FIG. 4 illustrates the functional blocks implemented by the controller 90, which include a dimensional reduction module 110 to carry out the dimensional reduction, a neural network 120, and a process control system 130 to adjust the polishing process, e.g., detect a polishing endpoint and halt polishing and/or adjust polishing pressures during the polishing process to reduce polishing non-uniformity, based on the series of characterizing values. As noted above, these functional blocks can be distributed across multiple computers.

The neural network 120 includes a plurality of input nodes 122 for each principal component, a plurality of hidden nodes 124 (also called "intermediate nodes" below), and an output node 126 that will generate the characteristic value. In a neural network having a single layer of hidden nodes, each hidden node 124 can be coupled to each input node 122, and the output node 126 can be coupled to each hidden node 124. In some implementations there are multiple output nodes, one of which provides the characteristic value.

In general, a hidden node 124 outputs a value that a non-linear function of a weighted sum of the values from the input nodes 122 to which the hidden node is connected.

For example, the output of a hidden node 124, designated node k, can be expressed as:

$$\tan h(0.5 * a_{k1}(I_1) + a_{k2}(I_2) + \ldots + a_{kM}(I_M) + b_k) \qquad \text{Equation 1}$$

where tan h is the hyperbolic tangent, $a_{kx}$ is a weight for the connection between the $k^{th}$ intermediate node and the $x^{th}$ input node (out of M input nodes), and $I_M$ is the value at the $M^{th}$ input node. However, other non-linear functions can be used instead of tan h, such as a rectified linear unit (ReLU) function and its variants.

The dimensional reduction module 110 will reduce a measured spectrum to a more limited number of component values, e.g., L component values. The neural network 120 includes an input node 122 for each component into which the spectrum is reduced, e.g., where the module 110 generates L component values the neural network 120 will include at least input nodes $N_1, N_2 \ldots N_L$.

Thus, where the number of input nodes corresponds the number of components to which the measured spectrum is reduced (i.e., L=M), the output $H_k$ of a hidden node 124, designated node k, can be expressed as:

$$H_k = \tan h(0.5 * a_{k1}(I_1) + a_{k2}(I_2) + \ldots +_{akL}(I_L) + b_k)$$

Assuming that the measured spectrum S is represented by a column matrix $(i_1, i_2, \ldots, i_n)$, the output of an intermediate node 124, designated node k, can be expressed as:

$$H_k = \tan h(0.5 * a_{k1}(V_1 \cdot S) + a_{k2}(V_2 \cdot S) + \ldots + a_{kL}(V_L \cdot S) + b_k) \qquad \text{Equation 2}$$

where $V_x$ is a row matrix $(v_1, v_2, \ldots, v_n)$ that will provide a transformation of the measured spectrum to a value for the $x^{th}$ component of the reduced dimensionality data (out of L components). For example, $V_x$ can be provided by the $x^{th}$ column (out of L columns) of the matrix W or W' described below, i.e., $V_x$ is the $x^{th}$ row of $W^T$. Thus, $W_x$ can represent an $x^{th}$ eigenvector from the dimensional reduction matrix.

The output node 126 can generate a characteristic value CV that is a weighted sum of the outputs of the hidden nodes. For example, this can be expressed as $$CV = C_1 * H_1 + C_2 * H_2 + \ldots + C_L * H_L$$

where $C_k$ is the weight for the output of the $k^{th}$ hidden node.

However, neural network 120 may optionally include one or more other input nodes (e.g., node 122a) to receive other data. This other data could be from a prior measurement of the substrate by the in-situ monitoring system, e.g., spectra collected from earlier in the processing of the substrate, from a measurement of a prior substrate, e.g., spectra collected during processing of another substrate, from another sensor in the polishing system, e.g., a measurement of temperature of the pad or substrate by a temperature sensor, from a polishing recipe stored by the controller that is used to control the polishing system, e.g., a polishing parameter such as carrier head pressure or platen rotation rate use for polishing the substrate, from a variable tracked by the controller, e.g., a number of substrates since the pad was changed, or from a sensor that is not part of the polishing system, e.g., a measurement of a thickness of an underlying films by a metrology station. This permits the neural network 120 to take into account these other processing or environmental variables in calculation of the characterizing value.

Returning to FIG. 1 again, the polishing apparatus 20 includes a second in-situ monitoring system 150 that is not a spectrographic monitoring system. The second in-situ monitoring system 150 can be a monitoring system that does not utilize visible light, e.g., a temperature monitoring system that uses an infrared camera. The second in-situ monitoring system 150 can be a non-optical monitoring system, e.g., a temperature monitoring system using a thermocouple, an acoustic monitoring system, a motor current or motor torque monitoring system, a friction monitoring, or an eddy current monitoring system.

As a temperature monitoring system, the second in-situ monitoring system 150 can include a temperature sensor 152 to monitor a temperature of the polishing process, e.g., of the polishing pad 30 or substrate 10. The temperature sensor can be an infrared sensor, e.g., an infrared camera positioned to take an infrared image of the polishing pad 30. Alternatively, the temperature sensor 152 could be a thermocouple attached or embedded in another component, e.g., in the platen 22 or the carrier head 50, to measure a temperature of the polishing pad or substrate.

As an acoustic monitoring system, the second in-situ monitoring system 150 can include an active or passive acoustic sensor 154 to monitor vibrations from the interface between the substrate 10 and polishing pad 10.

As a motor torque monitoring system, the second in-situ monitoring system 150 can include a sensor to measure a motor torque. The measurement of motor torque can be a direct measurement of torque and/or a measurement of current supplied to a motor. For example, a current sensor 170 can monitor the current supplied to the platen motor 24 and/or a current sensor 172 can monitor the current supplied to the carrier head motor 64. Although the current sensor is illustrated as part of the motor, the current sensor could be part of the controller (if the controller itself outputs the drive current for the motors) or a separate circuit. Alternatively, a torque meter can be placed on the platen drive shaft 26 and/or a torque meter can be placed on the carrier head drive shaft 62.

As a friction monitoring, the second in-situ monitoring system 150 can include a sensor to measure friction against the substrate or carrier head, e.g., a strain gauge placed on the carrier head drive shaft 62 or on an internal spindle of the carrier head.

In any event, the output signal of the sensor of the second in-situ monitoring system 150, e.g., the temperature sensor 152, acoustic sensor 154, or current sensor 170 and/or 172, is directed to the control system 90.

Figure 5:
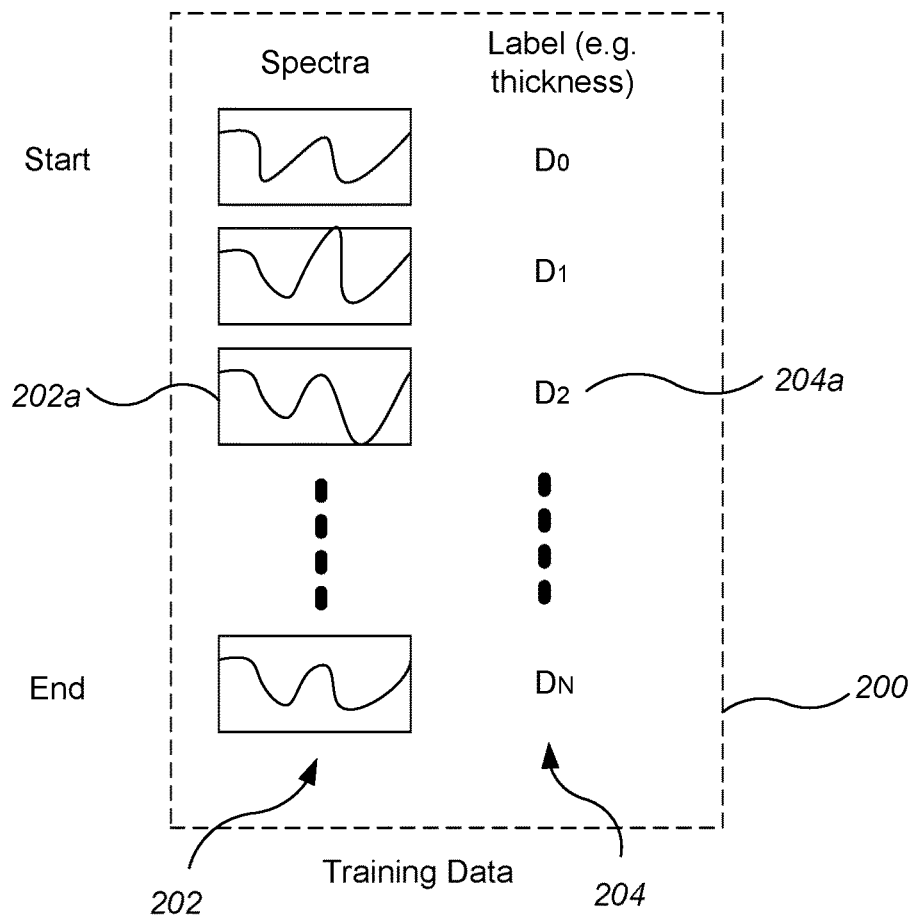
FIG. 5 illustrates training data for training the machine learning system.

Before being used for, e.g., device wafers, the dimensional reduction module 110 and the neural network 112 need to be configured. Referring to FIG. 5, as part of a configuration procedure for the dimensional reduction module 110 and the neural network 112, the controller 90 can receive a training data set 200 that includes plurality of training spectra 202 and a plurality of characterizing values 204 (indicated as $D_0, D_1, \ldots, D_N$). The characterizing values can be thickness values. Each training spectrum 202a is associated with a single corresponding characterizing value 204a. The plurality of training spectra 202 can include, for example, twenty to five-hundred training spectra.

Returning to FIG. 4, for the configuration procedure for the dimensional reduction module 110, the controller 90 can generate a group of eigenvectors for the covariant matrix of the data set of the training spectra. Once the group of eigenvectors have been generated, the eigenvectors can be ranked and a pre-set number of eigenvectors having the largest eigenvalues, e.g., the top four to eight, can be retained.

Ranking the eigenvectors by their associated eigenvalues shows the directions in which the dataset varies the most. A projection of a measured spectrum onto the highest ranked eigenvectors provides an efficient representation of the original vector in a significantly reduced basis.

As explanation, each training spectrum can be represented by a matrix:

$$R=(i_1, i_2, \ldots, i_n),$$

where $i_j$ represents the light intensity at the $j^{th}$ wavelength of a total of n wavelengths. The spectrum can include, for example, two-hundred to five-hundred intensity measurements; n can be two-hundred to five-hundred.

Suppose that m training spectra are generated, the m matrixes R can be combined to form the following matrix:

$$A = \begin{pmatrix} i_{11} & i_{12} & \ldots & i_{1n} \\ i_{21} & i_{22} & \ldots & i_{2n} \\ \vdots & \vdots & \ldots & \vdots \\ i_{m1} & i_{m2} & \ldots & i_{mn} \end{pmatrix},$$

where $i_{jk}$ represents the light intensity at the $k^{th}$ wavelength of the $j^{th}$ training spectrum. Each row of the matrix A represents a training spectrum (e.g., a measurement at one location on a substrate).

A dimensional reduction process, such as principal component analysis (PCA), is applied to the matrix A. PCA performs an orthogonal linear transformation that transforms the data in the A matrix (m×n dimensions) to a new coordinate system such that the greatest variance by any projection of the data comes to lie on the first coordinate (called the first principal component), the second greatest variance on the second coordinate, and so on. Mathematically, the transformation is defined by a set of p-dimensional vectors of weights $w_k=(w_{k1}, w_{k2}, \ldots w_{kp})$ that map each m-dimensional row vector $A_i$ of the matrix A to a new vector of principal component scores $t_i=(t_{k1}, t_{k2}, \ldots, t_{ip})$, where $t_{ki}$ is:

$$t_{ki}=A_i \cdot w_k.$$

Each vector $w_k$ is constrained to be a unit vector. As a result, the individual variables of $t_i$ inherits the maximum possible variance from the matrix A. The decomposition of the matrix A can be written as:

$$T=AW,$$

where W is a n-by-p matrix whose columns are the eigenvectors of $A^T A$.

Details of PCA are also discussed in Functional Data Analysis by James Ramsay and B. W. Silverman (Springer; 2nd edition (Jul. 1, 2005)), and Principal Component Analysis by I. T. Jolliffe (Springer; 2nd edition (Oct. 2, 2002).

Instead of PCA, the controller can use SVD (Singular Value Decomposition), which is a generalized eigen-decomposition of the training spectrum dataset, or ICA (Independent Component Analysis), in which a pre-specified number of statistically independent signals are found whose additive combinations give rise to the training spectrum dataset.

Next, the dimensionality can be reduced by keeping only the highest ranked eigenvectors. In particular, instead of p principal components, a total of L principal components, with L being an integer between 0 and p, e.g., three to ten, can be kept. For example, the T matrix can be reduced to a m×L matrix T', e.g., by keeping using the leftmost L columns of the T matrix. Similarly, the W matrix can be reduced to a n×L matrix W', e.g., by keeping the leftmost L columns of the W matrix.

As another example, a non-linear dimensionality reduction technique such as autoencoding could be used. An autoencoder used could be implemented as a neural network which attempts to reconstruct the original input (which may have a dimensionality of N) by passing it through multiple layers. One of the intermediate layers will have a reduced number of hidden neurons. The network is trained by minimizing the difference between the output layer and input layer. The values of the hidden neurons can be considered to be the reduced dimensionality spectra in such a case. This technique can provide an advantage over PCA and other similar techniques due to the fact that the dimensionality reduction is no longer a linear process.

For the configuration procedure for the neural network 120, the neural network 120 is trained using the component values and characteristic value for each training spectrum.

Each row of the matrix T' corresponds to one of the training spectra, and is thus associated with a characteristic value. While the neural network 120 is operating in a training mode, such as a backpropagation mode, the values $(t_1, t_2, \ldots, t_L)$ along a particular row are fed to the respective input nodes $N_1, N_2 \ldots N_L$ for the principle components while the characteristic value V for the row is fed to the output node 126. This can be repeated for each row. This sets the values for $a_{k1}$, etc., above.

Determination of the principal components, e.g., by PCA, SVD, ICA, etc., can be performed using a larger data than the data set used for training of the neural network. That is, the number of spectra used for determination of the principal components can be larger than the number of spectra having known characteristic values that are used for training. Once trained, the system should be ready for operation.

The system is now ready for operation. A spectrum measured from a substrate during polishing using the in-situ spectrographic monitoring system 70. The measured spectrum can be represented by a column matrix $S=(i_1, i_2, \ldots, i_n)$, where $i_j$ represents the light intensity at the jth wavelength of a total of n wavelengths. The column matrix S is multiplied by the W' matrix to generate a column matrix, i.e., $S \cdot W'=P$, where $P=(P_1, P_2, \ldots, P_L)$, with $P_i$ representing the component value of the $i^{th}$ principle component.

While the neural network 120 is used in an inference mode, these values $(P_1, P_2, \ldots, P_L)$ are fed as inputs to the respective input nodes $N_1, N_2, \ldots N_L$. As a result, the neural network 120 generates a characteristic value, e.g., a thickness, at the output node 126.

The combined calculation performed by the dimensional reduction module 110 and the neural network 120 to generate the characteristic value CV can be expressed as follows: $CV=C_1*\tan h(0.5(N_1 \cdot S)+0.5b_1)+C_2*\tan h(0.5(N_2 \cdot S)+0.5b_2)+ \ldots +C_L*\tan h(0.5(N_L \cdot S)+0.5b_L)$ where $N_k=(a_{k1}V_1 \cdot + a_{k2}V_2 \cdot + \ldots +a_{kL}V_L)$ with the weights $a_{ki}$ being the weights set by the neural network 120 and the vectors $V_i$ being the eigenvectors determined by the dimensional reduction module 110.

The architecture of the neural network 120 can vary in depth and width. For example, although the neural network 120 is shown with a single column of intermediate nodes 124, it could include multiple columns. The number of intermediate nodes 124 can be equal to or greater than the number of input nodes 122.

Although a neural network has been described above, other algorithms that are trainable by machine learning techniques can be used, e.g., gradient boosted trees, or approximate nearest neighbors methods such as locality-sensitive hashing.

As noted above, the controller 90 can associate the various measured spectra with different zones 12a-12c (see FIG. 2) on the substrate 10. The output of each neural network 120 can be classified as belonging to one of the zones based on the position of the sensor on the substrate 10 at the time the spectrum is measured. This permits the controller 90 to generate a separate sequence of characteristic values for each zone.

Figure 6:
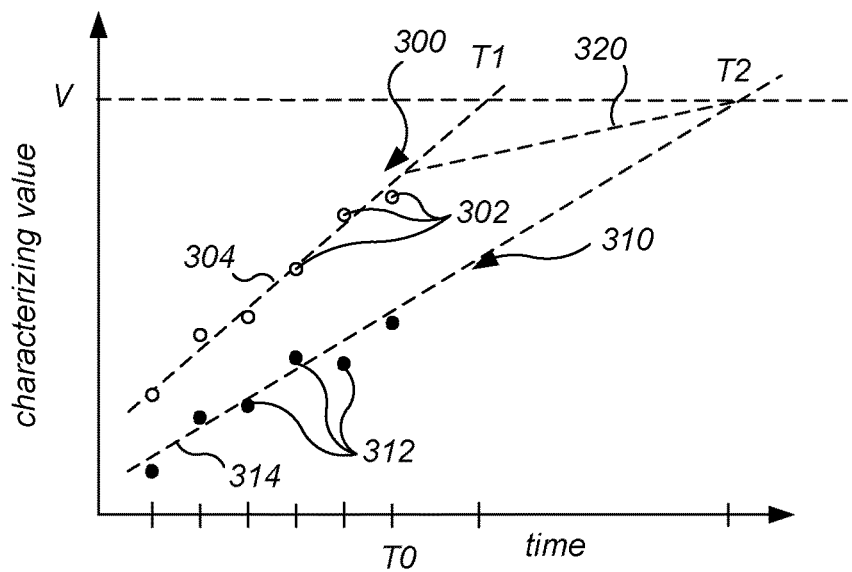
FIG. 6 illustrates a graph of characterizing values output by the control system as a function of time.

The sequence of characteristic values can be used to control the polishing system. For example, referring to FIG. 6, a first function 304 can be fit to the sequence 300 of characteristic values 302 for a first zone, and a second function 314 can be fit to the sequence 310 of characteristic values 312 for a second zone. The controller can calculate the times T1 and T2 at which the first and second functions are projected to reach a target value V, and calculate an adjusted processing parameter, e.g., an adjusted carrier head pressure, that will cause one of the zones to be polished at a revised rate (shown by line 320) such that the zones reach the target at approximately the same time.

A polishing endpoint can be triggered by the controller 90 at the time that a function indicates the characteristic values reaches the target value V.

Returning to FIG. 5, the training data set 200 includes the training spectra 202 and the characterizing values 204. The first and last characterizing values $D_0$, $D_N$ can be generated by ex-situ metrology measurements, e.g., an in-line or stand-alone metrology system, such as a contact profilometer or ellipsometer. These measurements can be conducted in dry conditions, e.g., after the substrate has been removed from the polishing system and cleaned and dried.

Although linear interpolation based on time could be used to generate characterizing values $D_1, \ldots D_{N-1}$, for some applications linear interpolation does not generate sufficiently accurate characterizing values.

Figure 7:
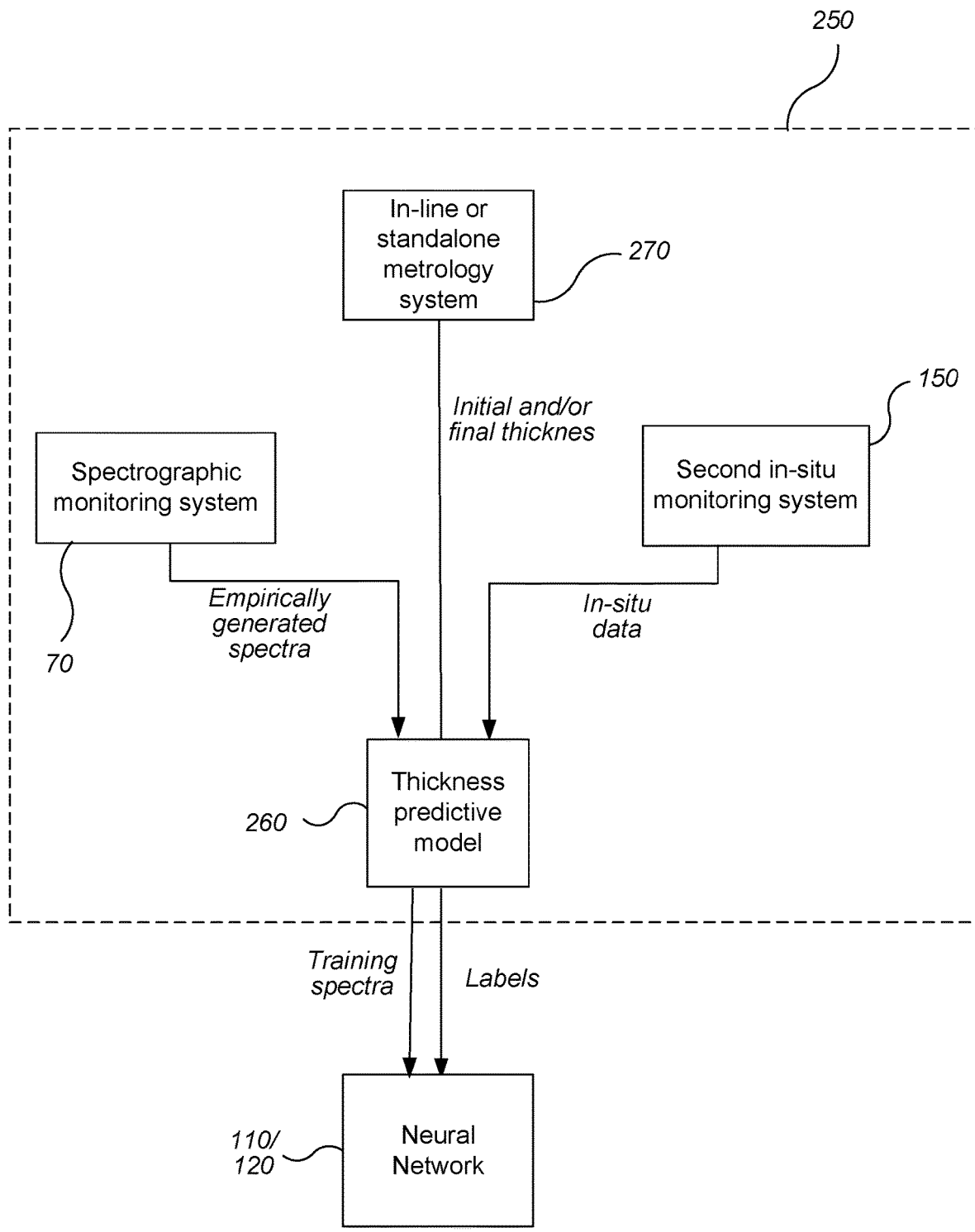
FIG. 7 is a schematic diagram of components used to generate training spectra.

FIG. 7 illustrates a training data generating system 250 for generating training values for the training spectra. The training data generating system 250 includes the spectrographic in-situ monitoring system 70, the second in-situ monitoring system 150, the ex-situ metrology system 270, and a thickness predictive model 260 that receives data from each of these systems and generates a label, e.g., a characteristic value, such as a thickness, for each test spectrum.

The thickness predictive model 260 includes a model of the substrate being polished, e.g., an indication of the number of layers to be polished in the polishing operation and an approximate thickness of each layer or a relative polishing rate for each layer. Based on data from the second in-situ monitoring system 150, the predictive model 260 can make more accurate determination of characteristic values than simple linear interpolation.

For example, the predictive model 260 can detect from the data from the second in-situ monitoring system a time during polishing of a transition between layers being polished. Characterizing values from the start of polishing to the transition time can be linearly interpolated at a first slope, and characterizing values from the transition time to the end of polishing can be linearly interpolated at a second slope, with the ratio between the first slope and second slope set by the relative polishing rate for each layer stored by the thickness predictive model.

More particularly, in order to generate the training data set 200, at least one test substrate can be polished by a polishing apparatus 20 in a data-gathering mode. During polishing in the data-gathering mode, the test substrate is monitored by both the spectrographic in-situ monitoring system 70 and the second in-situ monitoring system 150. The spectrographic in-situ monitoring system 70 measures a sequence of spectra, $S_0, S_1, \ldots S_N$, and the control system stores both the spectra $S_0, S_1, \ldots S_N$, and the respective time of measurement $T_0, T_1, T_2, \ldots, T_N$ for each respective spectrum. Similarly, the second in-situ monitoring system 150 generates a sequence of measurements $X_0, X_1, X_2, \ldots X_M$, and the control system stores both the measurements $X_0, X_1, X_2, \ldots X_M$, and the respective time of measurement $t_0, t_1, t_2, \ldots, t_M$ for each respective measurement. What the measurements $X_0, X_1, X_2, \ldots X_M$, represent depend on the type of monitoring system, e.g., temperature values for a temperature monitoring system, motor current values for a motor current monitoring system, acoustic signal strength for an acoustic monitoring system, etc.

In some implementations, the spectrographic in-situ monitoring system 70 and the second in-situ monitoring system 150 generate measurements at the same frequency. In this case M=N. However, this is not required, e.g., the second in-situ monitoring system 150 can generate measurements at a higher or lower frequency than the spectrographic in-situ monitoring system 70.

Figure 8:
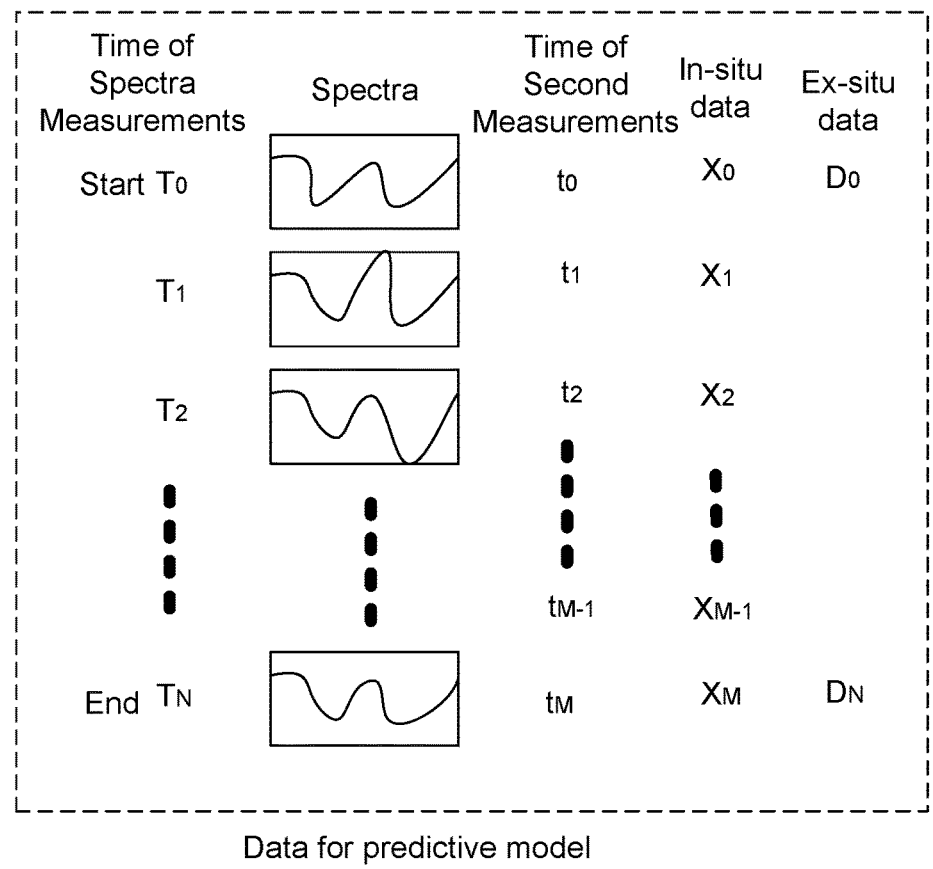
FIG. 8 illustrates data fed to the predictive model.

Referring to FIG. 8, the test spectra $S_0, S_1, S_2, \ldots S_N$, the time of measurement $T_0, T_1, T_2, \ldots, T_N$ for each test spectrum, the measurements $X_0, X_1, X_2, \ldots X_M$, the respective time of each measurement $t_0, t_1, t_2, \ldots, t_M$, and the first and/or last characterizing values $D_0, D_1, \ldots D_N$ are received by the predictive model 260 from the in-situ monitoring system 70, the second in-situ monitoring system 150, and the ex-situ metrology system 270. Where a pre-polish measurement is not be available, a preset consistent incoming value can be used for the label. Similarly, where a post-polish measurement is not be available, a preset consistent outgoing value can be used for the label. In any event, from this data, the predictive model 270 generates the training characterizing values $D_0, D_1, \ldots D_N$ that would occur at the measurement times $T_0, T_1, T_2, \ldots, T_N$, and associates each training value $D_0, D_1, \ldots D_N$ with the respective test spectrum $S_0, S_1, S_2, \ldots S_N$, that was measured at the respective time $T_0, T_1, T_2, \ldots, T_N$.

Figure 9:
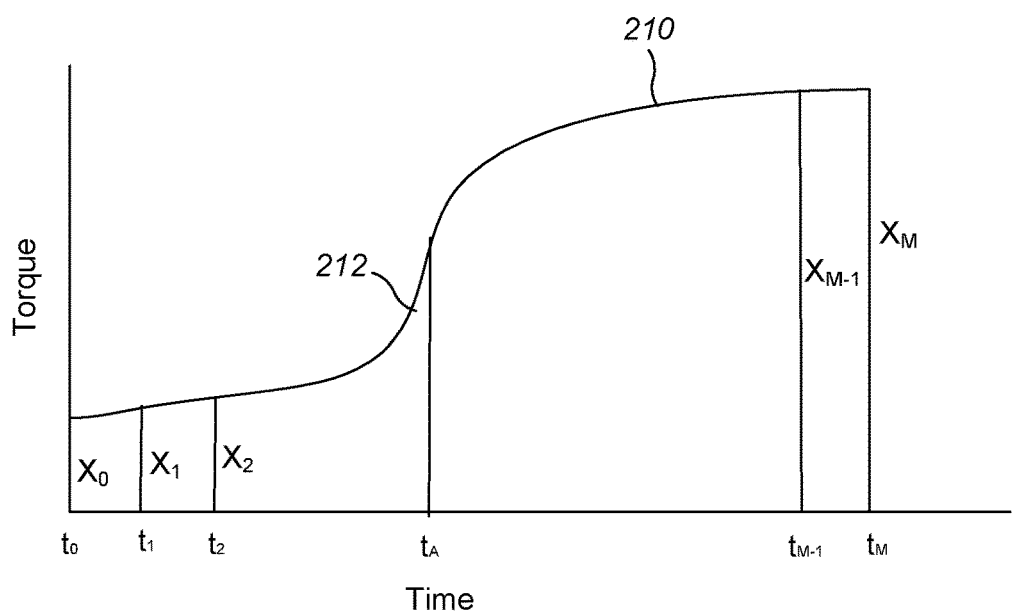
FIG. 9 illustrates a graph of motor torque over time.

In some implementations, the predictive model 270 analyzes the measurements $X_0, X_1, X_2, \ldots X_M$, to segment the polishing process by time into two or more time periods. The predictive model 270 can calculate a transition time between the segments by detecting a sharp change in the measurements, e.g., by detecting that the first derivative of the sequence of measurements exceeds a threshold. For example, FIG. 9 illustrates an example graph 260 of motor torque as a function of time, with $X_0, X_1, X_2, \ldots X_M$ representing torque or motor current values. The graph includes a highly sloped region 212. By detecting the maximum (or minimum) value in the first derivative of the sequence of measurements $X_0, X_1, X_2, \ldots X_M$, the predictive model 270 can assign a time $t_A$ for transition between two time periods.

The characterizing values $D_0, D_1, \ldots D_a$ in the first time segment, e.g., before transition time $t_A$, can be computed by the thickness predictive model according to a first function, whereas characterizing values $D_{a+1}, D_{a+2}, \ldots D_N$ in the second time segment, e.g., after transition time $t_A$, can be computed by the thickness predictive model according to a different second function. The first and second functions can be linear functions with different slopes, although other functions, e.g., higher order polynomial functions, are possible.

In some implementations, the predictive model stores a preset polishing rate ratio, e.g., an empirically derived ratio, indicating the ratio of polishing rates for the different time segments. For example, if the predictive model indicates that the polishing rate in the second time period is R times the polishing rate in the first time period, the predictive model can generate values for D from subject to the restraints that $D=D_0$ at time $T_0$, $D=D_N$ at time $T_N$, D is a first linear function from $T_0$ to $t_A$, D is linear a second linear function from $t_A$ to $T_N$, and the slope of the second linear function is R times slope of the first linear function. This is sufficient information to generate the training characterizing values $D_0, D_1, D_2, \ldots D_N$ at respective times $T_0, T_1, T_2, \ldots, T_N$.

In some implementations, the predictive model generates a polishing rate ratio based on the measurements $X_0, X_1, X_2, \ldots X_M$, during the respective time periods. For example, the predictive model can calculate an average value $X_A$ for the measurements in the first time period, and an average value $X_B$ for the measurements in the second time period. These values can then be compared to infer which time segment was polishing faster, and a polishing rate ratio. For example, if the average motor torque for the second time segment ($t_A$ to $T_N$) is higher than the first time segment ($T_0$ to $t_A$), then the predictive model can infer that more material was removed during the second time segment. Similarly, higher temperature can indicate a higher polishing rate, and a higher acoustic signal can indicate a higher polishing rate. The predictive model can generates a polishing rate ratio based on the relative difference between $X_A$ and $X_B$.

In some implementations, the predictive model includes a function that converts the measurements $X_0, X_1, X_2, \ldots X_M$, into a respective normalized polishing rate for each measurement. This effectively permits continuous variation of the polishing rate rather than linear interpolation.

Although the discussion above has focused on time segments within polishing of a single test substrate, if multiple test substrates are used to generate the test spectra, then similar comparisons can be made between polishing of different test substrates.

For any of the above approaches, once the test characterizing values $D_0, D_1, \ldots D_N$ have been generated for the respective time $T_0, T_1, T_2, \ldots, T_N$, the predictive model can pair each respective characterizing value with the respective test spectrum $S_0, S_1, S_2, \ldots S_N$, that was measured at that respective time $T_0, T_1, T_2, \ldots, T_N$. This data can then be output as the training data 200 (see FIG. 5) that is then used to train the neural network 120 (see FIG. 7). Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a machine-readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier heads, or both can move to provide relative motion between the polishing surface and the substrate. For example, the platen may orbit rather than rotate. The polishing pad can be a circular (or some other shape) pad secured to the platen. The polishing system can be a linear polishing system, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used relative orientation or positioning of the components; it should be understood that the polishing surface and substrate can be held in a vertical orientation or some other orientation with respect to gravity.

Although the description above has focused on chemical mechanical polishing, the control system can be adapted to other semiconductor processing techniques, e.g., etching or deposition, e.g., chemical vapor deposition. In addition, the technique can be applied to an in-line or stand-alone metrology system rather than in-situ monitoring.

Particular embodiments of the invention have been described. Other embodiments are within the scope of the following claims.

What is claimed is:

1. A method of training a neural network for spectrographic monitoring, the method comprising:
    polishing a test substrate;
    during polishing of the test substrate, measuring by an in-situ spectrographic monitoring system a sequence of test spectra of light reflected from the test substrate;
    during polishing of the test substrate, measuring by an in-situ non-optical monitoring system a sequence of test values from the test substrate;
    measuring by an ex-situ metrology system at least one of an initial characterizing value for the test substrate before polishing or a final characterizing value for the test substrate after polishing;
    inputting the sequence of test values and the initial characterizing value and/or final characterizing value into a thickness predictive model which divides a polishing time into a plurality of segments, wherein the thickness predictive model outputs a sequence of training values, each respective training value in the sequence of training values associated with a respective test spectrum from the sequence of test spectra; and
    training an artificial neural network using the sequence of test spectra and the sequence of training values, the artificial neural network having a plurality of input nodes for a plurality of spectral values, an output node to output a characterizing value, and a plurality of hidden nodes connecting the input nodes to the output node.

2. The method of claim 1, further comprising:
    polishing a device substrate;
    receiving, from an in-situ optical monitoring system, a measured spectrum of light reflected from the device substrate as the device substrate undergoing polishing;
    generating a measured characterizing value for the measured spectrum at the output node of the trained artificial neural network by applying spectral values from the measured spectrum to the input nodes of the trained artificial neural network; and
    at least one of halting processing of the device substrate or adjusting a processing parameter based on the characterizing value.

3. The method of claim 1, wherein the sequence of training values includes a first multiplicity of training values for a first segment of the plurality of segments and a second multiplicity of training values for a second segment of the plurality of segments, and the thickness predictive model computes the first multiplicity of training values according to a first function and computes the second multiplicity of training values according to a second function.

4. The method of claim 3, wherein the thickness predictive model computes the first multiplicity of training values and the second multiplicity of training values according to a constraint that the first function equals the second function at a boundary time between the plurality of segments.

5. The method of claim 3, wherein the thickness predictive model computes the first multiplicity of training values and the second multiplicity of training values according to a constraint that the first function generates the initial characterizing value at a start time of polishing corresponding to a first of the sequence of test spectra and/or the second function generates the final characterizing value at an end time of polishing corresponding to a last of the sequence of test spectra.

6. The method of claim 3, wherein the first function is a first linear function with a first slope and the second function is a second linear function with a different second slope.

7. The method of claim 6, wherein the thickness predictive model stores a predetermined ratio of the first slope to the different second slope, and sets the first slope and second slope to satisfy the predetermined ratio.

8. The method of claim 6, wherein the thickness predictive model calculates the first slope and second slope based on a comparison of a first multiplicity of test values from the sequence of test values in the first segment and a second multiplicity of test values from the sequence of test values in the second segment.

9. The method of claim 8, wherein the thickness predictive model calculates the first slope based on a first average value of the first multiplicity of test values and calculates the second slope based on a second average value of the second multiplicity of test values.

10. The method of claim 1, wherein the thickness predictive model calculates a slope of the sequence of test values and selects a boundary time between the plurality of segments based on the slope.

11. The method of claim 10, wherein the thickness predictive model selects a boundary time based on an extrema in a first derivative of the sequence of test values.

12. The method of claim 1, wherein the thickness predictive model calculates each respective training value based on at most two values that are closest in time to the time for the respective training value.

13. The method of claim 1, wherein the sequence of test spectra of light are measured at a first frequency and the sequence of test values are measured at a different second frequency.

14. The method of claim 1, wherein the in-situ non-optical monitoring system comprises a motor torque monitoring system, an acoustic monitoring system, or a monitoring system.

15. A computer program product, comprising a plurality of instructions encoded in a non-transitory computer readable medium to cause one or more computers to:
receive a sequence of test spectra of light reflected from a substrate undergoing polishing;
receive a sequence of test values from the substrate from an in-situ non-optical monitoring system;
receive at least one of an initial characterizing value for the substrate before polishing or a final characterizing value for the substrate after polishing from an ex-situ metrology system;
divide a polishing time into a plurality of segments;
calculate a sequence of training values based on the sequence of test values and the initial characterizing value and/or the final characterizing value; and
associate each spectrum from the sequence of test spectra with a training value from the sequence of training values to provide a training data set for training of a neural network.

16. The computer program product of claim 15, comprising instructions to compute a first multiplicity of training values in a first segment of the plurality of segments according to a first function and to compute a second multiplicity of training values in a second segment of the plurality of segments according to a different second function.

17. The computer program product of claim 16, comprising instructions to compute the first multiplicity of training values and the second multiplicity of training values according to a constraint that the first function equals the different second function at a boundary time between the plurality of segments.

18. The computer program product of claim 16, comprising instructions to compute the first multiplicity of training values and the second multiplicity of training values according to a constraint that the first function generates the initial characterizing value at a time corresponding to a first of the sequence of test spectra and/or the different second function generates the final characterizing value at an end time corresponding to a last of the sequence of test spectra.

19. A chemical mechanical polishing system, comprising:
a platen to support a polishing pad;
a carrier head to hold a substrate against the polishing pad;
a motor to generate relative motion between the platen and the carrier head;
an in-situ spectrographic monitoring system to measure a sequence of spectra of light reflected from the substrate during polishing; and
an artificial neural network having a plurality of input nodes and an output node, the artificial neural network trained using a training data set including a plurality of training spectra and a plurality of training values generated by a thickness predictive module from a sequence of test values measured by a non-optical in-situ monitoring system and an initial characterizing value and/or final characterizing value from an ex-situ metrology system, wherein the thickness predictive module divides a polishing time into a plurality of segments.

* * * * *